United States Patent [19]
Troester

[11] 4,014,411
[45] Mar. 29, 1977

[54] MECHANICALLY ACTUATED DISC BRAKE WITH SELF ADJUSTING FEATURE

[75] Inventor: Thomas F. Troester, Dayton, Ohio

[73] Assignee: Dayton-Walther Corporation, Dayton, Ohio

[22] Filed: June 4, 1976

[21] Appl. No.: 693,095

[52] U.S. Cl. .............. 188/71.9; 188/72.8; 188/196 BA
[51] Int. Cl.² ............ F16D 55/02; F16D 65/56
[58] Field of Search .......... 188/72.6, 72.7, 72.8, 188/71.8, 71.9, 196 P, 196 B, 196 BA, 196 D, 196 V; 192/111 A

[56] References Cited
UNITED STATES PATENTS

| | | | |
|---|---|---|---|
| 3,111,198 | 11/1963 | Hodkinson | 188/71.9 |
| 3,155,195 | 11/1964 | Brawerman | 188/71.9 |
| 3,820,635 | 6/1974 | Hurt | 188/72.6 X |

Primary Examiner—Trygve M. Blix
Assistant Examiner—Douglas C. Butler
Attorney, Agent, or Firm—Biebel, French & Nauman

[57] ABSTRACT

A self-adjusting, mechanically actuated disc brake assembly in which the brake pads are pressed against the brake disc by cooperating drive threads formed on an actuating shaft and a piston. Adjustment is obtained by an adjuster nut having a fine thread complementary to and in engagement with a fine thread formed on the actuating shaft and a ratchet mechanism, including cooperating inclined teeth and spring loaded pins carried by the adjuster nut and an opposing portion of the piston. The frictional forces between the nut and the shaft are greater than those generated by contact between the nut and other portions of the assembly so that the nut tends to rotate in unison with the shaft. However, when the rotational movement of the shaft necessary to cause full engagement of the brakes becomes great enough, the spring loaded pins will slide over the edges of the inclined teeth, preventing retrograde movement of the nut and resulting in relative rotational movement between the nut and the shaft which advances the shaft towards the brake disc to compensate for brake wear.

10 Claims, 3 Drawing Figures

MECHANICALLY ACTUATED DISC BRAKE WITH SELF ADJUSTING FEATURE

BACKGROUND OF THE INVENTION

Mechanical brake systems, including those brake systems in which the force is applied to the mechanical components by means of pneumatic pressure, i.e., air brakes, are generally of the type in which brake shoes are pressed outwardly against a brake drum. Disc brake systems, on the other hand, generally include hydraulically actuated pistons and cylinders, with the pistons being forced outwardly to press the brake pads against the disc face by means of hydraulic pressure.

Additionally, although most hydraulic brake systems include some type of self-adjusting mechanism for compensation for brake pad wear, mechanical brake systems, including those actuated by air pressure, generally do not include such self-adjusting features.

SUMMARY OF THE INVENTION

The present invention is directed towards a mechanical brake system, which could be actuated by foot or through the imposition of a pneumatic actuator, but which is a disc type brake which includes self-adjusting mechanisms to compensate for brake pad wear.

Thus, the brake system includes an actuator shaft having a drive thread formed on a first section of its length complementary to and in engagement with a drive thread formed on a second component of the system which is used to apply force to the brake pads, usually through the medium of a torque plate. This member may take the form of a hollow piston slidably received in a cylinder formed in the brake system housing, although it will be apparent that the piston-cylinder configuration is not essential to the invention.

In either case the actuating shaft is also provided with a fine thread on a second section of its length which is complementary to and in engagement with a fine thread formed in an adjuster nut.

If the piston-cylinder arrangement is used, the adjuster nut may be disposed within the hollow piston. In this case, cooperating ratchet means are formed in the opposing surfaces of the adjuster nut and the hollow piston. Otherwise, the cooperating ratchet means may be formed between the outer surface of the adjuster nut and the wall of a recess formed in a portion of the brake system housing.

Again, in either case the frictional forces between the contacting portions of the adjuster nut and the second section of the shaft are greater than the frictional forces between the nut and other portions of the brake assembly.

Thus, the nut will tend to rotate in unison with the actuator shaft. The ratchet mechanism will allow this rotation without substantial restriction in either direction until the amount of brake wear is such that shaft rotation during brake application causes the pin means of the ratchet mechanism to ride over an edge of an inclined tooth of the ratchet. In the subsequent rotation of the shaft in the opposite direction as brake pressure is released, the nut will remain stationary. This will cause the shaft to advance towards the brake disc along its axis and compensate for brake pad wear.

Thus, the present invention provides a mechanical brake system of the disc type which includes means for automatically adjusting for brake pad wear.

DESCRIPTION OF THE PREFERRED EMBODIMENTS

Figure 1:
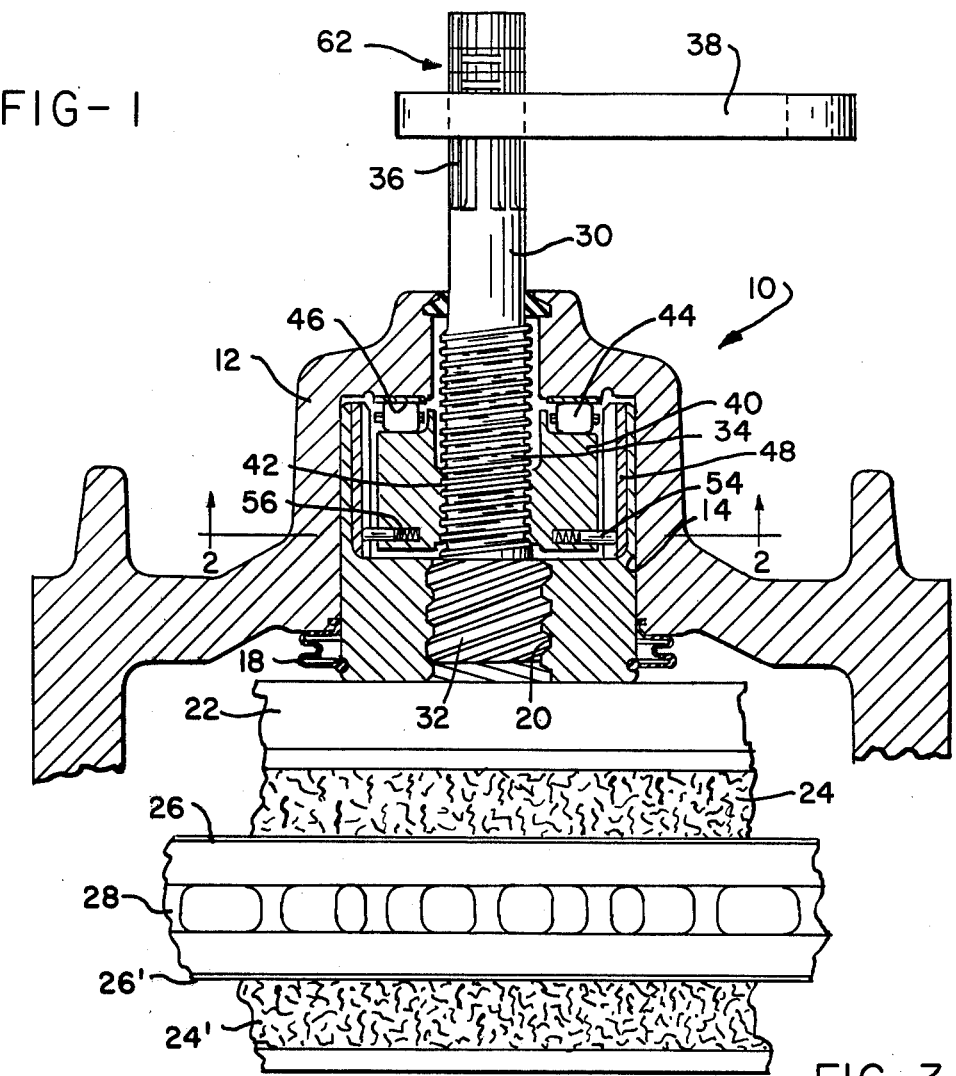
FIG. 1 is a view with parts in section of the main components of a brake assembly in accordance with the present invention.
Figure 2:
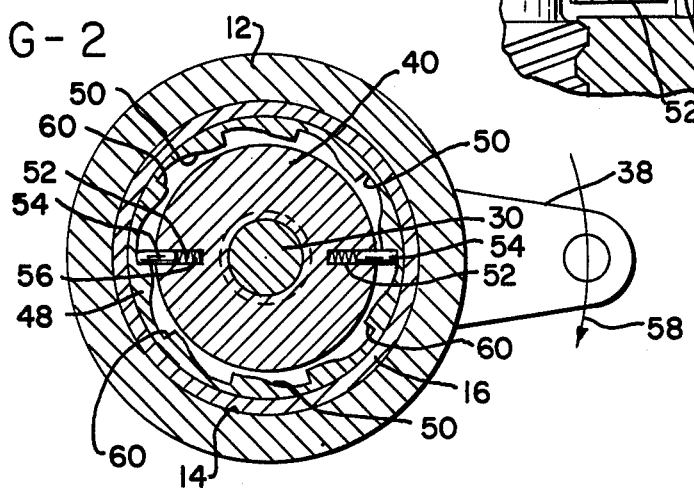
FIG. 2 is a view on line 2—2 of FIG. 1.

As seen in FIGS. 1 and 2, the brake assembly 10 of the present invention includes a brake housing 12 having a cylinder 14 formed therein and slidably receiving a piston 16. A boot type seal 18 may be interposed between the housing and the piston, both to keep out foreign materials, and through the resiliency of the boot, tend to return the piston to its innermost position within the cylinder.

As shown the piston is provided with a high lead drive thread 20 in a lower portion thereof and the piston is also keyed to a torque plate 22 through which pressure is applied to a lining 24 to press the lining 24 against a face 26 of the rotatable brake disc 28.

As is well known in the art, the brake disc 28 is fixed with respect to and rotates with the vehicle wheel while the lining 24 and related actuating mechanism do not rotate with the wheel and are fixed with respect to the frame of the vehicle. Additionally if the system is of the reaction type, the housing 12 will extend over or under the disc and carry a second brake pad 24' engageable with the opposite face 26' of the disc upon sliding movement of the housing 12 in a direction normal to the faces of the disc 28. Reaction disc brakes generally are conventional in the art and do not per se form part of the present invention.

Received within the housing 12 is an actuator shaft 30 which includes a first section having a high lead drive thread 32 complementary to and in engagement with thread 20 of the piston 16. The shaft 30 has a second section on which is formed a relatively fine thread 34 and an outer section which may be splined as at 36 to receive a lever 38 to rotate the shaft 30. The lever 38 may be connected through suitable linkage to a foot pedal or to a pneumatic actuating system.

While, as shown, the shaft 30 is provided with an external thread 32 and the piston 16 with an internal thread 20, it will be apparent that within the scope of the present invention piston 16 may be provided with an external thread complementary to and engaging an internal thread formed in the shaft 30.

Received within the hollow piston 16 is an adjuster nut 40 which is provided with a fine thread 42 complementary to and in engagement with the thread 34 of the shaft 30. Bearings 44 may be interposed between the adjuster nut 40 and a wear plate 46 in the housing 12 to reduce friction between the nut and the housing.

As best seen in FIG. 2 of the drawings, the inner wall of the piston 16 is provided with a ring insert 48 which includes a series of inwardly projecting, inclined teeth 50. The adjuster nut 40 may be provided with blind bore passages 52 containing pins 54 which are pressed outwardly by springs 56 into engagement with the teeth 50. Although the ring 48 is shown as formed separately from the piston 16 and fixed therein, as by shrink fitting or other suitable means, it will be apparent that the teeth could be machined or otherwise formed in the piston itself.

In operation it will be seen that rotation of the shaft 30 in the direction indicated by the arrow 58 will cause the piston 16 to move outwardly of the cylinder 14, pressing the brake lining 24 against the face 26 of the brake 28.

The nut 40 and shaft 30 are constructed such that the frictional forces generated through the contact between these two components is greater than the total frictional force generated by contact of the nut 40 with the other portions of the assembly, such as the contact of the pins 54 with the teeth 50 and the upper surface of the nut with the bearings 44.

As a result, as the shaft rotates forwardly in the direction indicated by the arrow 58, the nut 40 will rotate in unison with it. As the shaft 30 rotates in the opposite direction, however, the nut 40 will rotate with it only so long as the pins 54 are riding on the smoothly curved portions of the teeth 50. Therefore, if the pins 54 engage the steeply inclined faces 60 of the teeth during retractional rotation of the nut, as seen in FIG. 2, rotation of the nut will be stopped and the shaft will continue to rotate, advancing it toward the disc 28 and thereby compensating for lining wear.

In other words, as the linings wear, a greater rotation of the shaft is required to press the linings into engagement with the disc faces. This in turn causes the pins 54 to ride beyond the smoothly curved portions of the teeth 50 and drop down the sharp inclined faces 60 thereof, restricting retractional rotation of the nut 40 and advancing the shaft 30 as it rotates relative to the nut 40.

Since lever 38 will generally be fixed in directions parallel to the axis of shaft 30, movement of shaft 30 towards disc 28 during wear compensation can be used as an indication of brake wear. In this regard, the outer end of shaft 30 can be provided with markings 62 to indicate the amount of shaft movement relative to lever 38 and hence, the amount of brake pad wear.

In the above description the friction between the threaded portions of the nut and the second portion of the shaft 30 were depended upon to provide a greater force than that encountered by contact by the nut 40 with other portions of the system. If it is desired to increase the frictional force between the nut 40 and the second section of the shaft 30 resort may be had to modification of the fine threads on either or both members or by the provision of an interference fit between the two members.

Figure 3:
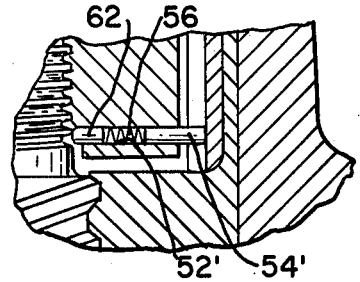
FIG. 3 is a fragmentary view illustrating a modification of the invention.

Additionally, as seen in FIG. 3, plugs 62 of high friction material may be utilized, pressed inwardly into engagement with the threads on the second section of the shaft 30. For convenience these plugs 62 can be received in open ended passages 52' with a spring 56' interposed between the plugs and pins 54' which are pressed outwardly into engagement with the teeth carried by the piston 16.

Additionally, although the teeth are described as being carried by the piston and the pins carried by the nut, it is obvious that these members can be reversed and the ratchet teeth formed on or carried by the exterior surface of the nut 40 and spring loaded pins or other type of pawl carried by the piston.

Further, it will be apparent that the pressure member carrying the high lead drive thread 20 need not be formed as a piston and slidably received within a cylinder in the housing 12. Instead, a recess may be formed in a housing merely to accommodate the adjuster nut, with opposing walls of the recess and the adjuster nut carrying the cooperating ratchet means and the pressure member thus never entering the recess nor functioning as a piston.

While the forms of apparatus herein described constitute preferred embodiments of the invention, it is to be understood that the invention is not limited to these precise forms of apparatus, and that changes may be made therein without departing from the scope of the invention.

What is claimed is:

1. In a mechanically actuated disc brake assembly including means for pressing a brake pad against a face of a brake disc, power threads carried by said pressing means, an actuating shaft rotatable about the longitudinal axis thereof, and power threads on a first section of said shaft complementary to and in engagement with said pressing means power threads, whereby braking rotational movement of said shaft about said axis thereof with said shaft restrained against axial movement away from said pressing means will cause said pressing means to press a brake pad against a face of brake disc, the improvement comprising:
   a. means defining a fine thread on a second section of said shaft,
   b. an actuating nut,
   c. means defining a fine thread on said nut complementary to and in engagement with said fine threads on said second section of said shaft,
   d. means defining a recess within which said nut is received,
   e. cooperating ratchet means on opposing portions of said nut and a wall of said recess,
   f. frictional forces due to friction between contacting surfaces of said nut and said second section of said shaft being greater than frictional forces between contacting surfaces of said nut and portions of said assembly other than said shaft, and
   g. said ratchet means permitting unlimited rotational movement of said nut in unison with said shaft during said braking rotational movement of said shaft but limiting the degree of rotational movement of said nut with said shaft during retracting rotational movement of said shaft,
   h. whereby said nut will rotate with said shaft except as limited by said ratchet means and said ratchet means may limit rotation of said adjuster nut with said shaft during retracting rotational movement thereof to cause relative rotational movement between said nut and said shaft to advance said shaft toward a face of a brake disc with which said shaft is associated.

2. The assembly of claim 1 wherein:
   a. said recess is formed in said pressing means.

3. The assembly of claim 2 wherein:
   a. said pressing means comprises a hollow piston slidably received in a cylinder formed in a housing for said assembly.

4. The assembly of claim 1 further comprising:
   a. bearing means interposed between said nut and said portions of said assembly other than said shaft.

5. The assembly of claim 1 wherein said ratchet means comprises:
   a. inclined teeth formed in said wall of said recess, and
   b. pawl means carried by said nut in engagement with said inclined teeth.

6. The assembly of claim 5 wherein said pawl means comprises:

a. spring loaded pins projecting outwardly of said nut into engagement with said inclined teeth.

7. The assembly of claim 1 further comprising:
   a. means for increasing said frictional forces between said contacting surfaces of said nut and said second section of said shaft.

8. The assembly of claim 7 wherein said means for increasing said frictional forces comprises:
   a. plugs of material carried by said nut and pressed into engagement with areas of said second section of said shaft.

9. The assembly of claim 8 wherein said ratchet means comprises:
   a. inclined teeth formed in said wall of said recess,
   b. bores formed in said nut, and
   c. pins received in said bores and projecting outwardly into engagement with said inclined teeth,
   d. said plugs being carried in opposite ends of said bores for said engagement with said second section of said shaft.

10. In a mechanically actuated self-adjusting disc brake assembly which includes a brake disc, a brake pad adapted to be pressed against a face of said disc, a brake housing having a cylinder therein, a piston slidably received in said cylinder for pressing said brake pad against said disc face, means defining a high lead internal thread in said piston, an actuating shaft rotatable about the longitudinal axis thereof, means defining a high lead external thread on a first section of said shaft complementary to and in engagement with said internal high lead thread in said piston, whereby forward rotational movement of said shaft will cause said piston to move outwardly of said cylinder and press said brake pad against said disc face and retractional rotational movement of said shaft will cause said piston to move inwardly of said piston and relieve brake pad pressure on said disc face, the improvement comprising:
   a. means defining on a second section of said shaft positioned in said piston relatively fine, external threads,
   b. an adjuster nut disposed in said piston and rotatable with respect thereto,
   c. means defining relatively fine, internal threads formed in said nut complementary to and in engagement with said relatively fine external threads on said shaft second section,
   d. frictional forces due to friction between contacting surfaces of said second section of said shaft and said adjuster nut being greater than frictional forces between contacting surfaces of said adjuster nut and portions of said assembly other than said shaft whereby said nut tends to rotate in unison with said shaft during rotational movement of said shaft, and
   e. cooperating ratchet means on opposing portions of said adjuster nut and said piston including inclined teeth formed in said piston and outwardly projecting spring loaded pins carried by said nut and engaging said inclined teeth, said teeth being inclined such that said adjuster nut is permitted to rotate with said shaft during forward rotational movement of said shaft and rotational movement of said nut is limited during retractional movement of said shaft to cause relative rotational movement between said nut and said shaft to advance said shaft towards said disc and compensate for wear of said brake pads.

* * * * *